United States Patent [19]

Zdepski

[11] Patent Number: 5,376,969
[45] Date of Patent: Dec. 27, 1994

[54] METHOD AND APPARATUS FOR CONVEYING COMPRESSED VIDEO DATA OVER A NOISY COMMUNICATION CHANNEL

[75] Inventor: Joel W. Zdepski, Belle Mead, N.J.

[73] Assignee: RCA Thomson Licensing Corporation, Princeton, N.J.

[21] Appl. No.: 151,459

[22] Filed: Nov. 15, 1993

[51] Int. Cl.[5] ............................................. H04N 7/12
[52] U.S. Cl. ..................................... 348/466; 348/384
[58] Field of Search ............... 348/384, 466, 467, 473, 348/470, 426; 371/37.1, 37.4; 375/26, 34; H04N 7/12, 7/13

[56] References Cited

U.S. PATENT DOCUMENTS

| | | | |
|---|---|---|---|
| 3,760,371 | 9/1973 | Pitroda et al. | 371/69.1 |
| 4,286,334 | 8/1981 | Gammel et al. | 371/69.1 |
| 4,785,349 | 11/1988 | Keith et al. | 358/136 |
| 4,807,033 | 2/1989 | Keesen et al. | 348/466 |
| 4,827,339 | 5/1989 | Wada et al. | 358/136 |
| 4,908,828 | 3/1990 | Tikalsky | 371/69.1 |
| 5,111,292 | 5/1992 | Joseph | 358/133 |
| 5,138,440 | 8/1992 | Radice | 358/13 |
| 5,144,424 | 9/1992 | Savatier | 358/133 |
| 5,144,425 | 9/1992 | Joseph | 358/133 |
| 5,148,271 | 9/1992 | Kato et al. | 348/466 |
| 5,148,272 | 9/1992 | Acampora et al. | 358/133 |
| 5,159,452 | 10/1992 | Kinoshita et al. | 358/141 |
| 5,164,963 | 11/1992 | Lawrence et al. | 375/58 |
| 5,168,356 | 12/1992 | Acampora et al. | 358/136 |
| 5,189,671 | 2/1993 | Cheng | 370/94.1 |
| 5,289,276 | 2/1994 | Siracusa et al. | 348/467 |

FOREIGN PATENT DOCUMENTS 0374548 6/1990 European Pat. Off. .
0441168 8/1991 European Pat. Off. .

OTHER PUBLICATIONS

An Experimental Digital VCR with New DCT-Based Bit-Rate Reduction System by M. Yoneda et al., IEEE Transactions on Consumer Electronics 37 (1991)Aug., No. 3, New York.
ISO-IEC JT(1/SC2/WG1), Coding of Moving Pictures and Associated Audio, MPEG 90/176 Rev. 2, Dec. 18, 1990.

Primary Examiner—Victor R. Kostak
Attorney, Agent, or Firm—Joseph S. Tripoli; Eric P. Herrmann; Ronald H. Kurdyla

[57] ABSTRACT

Elements of the compressed video signal which are of greatest importance to signal decompression are set a plurality of times in redundant transport cells. Media error codes are concatenated to the redundant data such that when and if such redundant data is applied to the corresponding decompressor, the media error code will automatically force the decompressor to resynchronize.

5 Claims, 8 Drawing Sheets

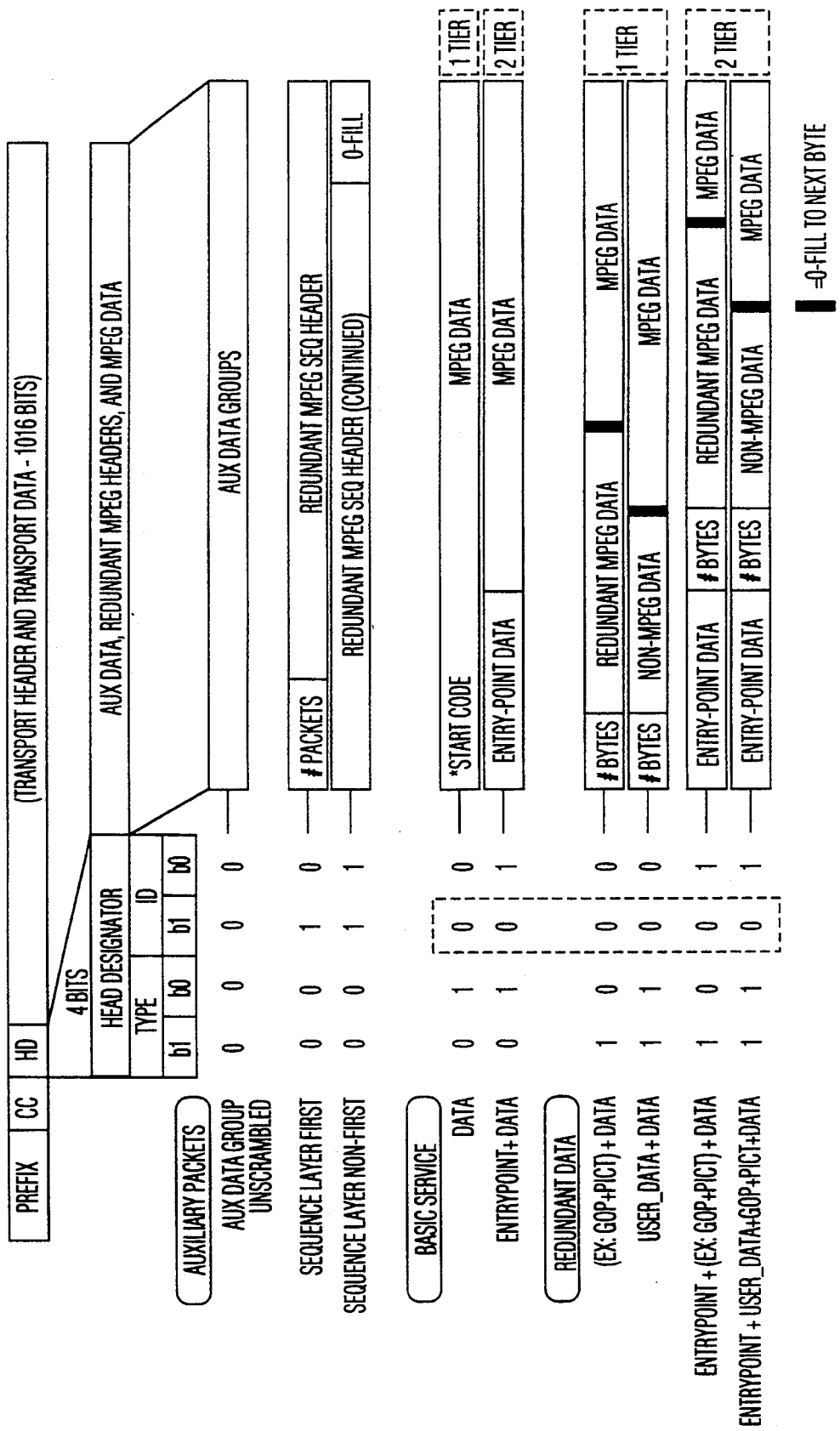

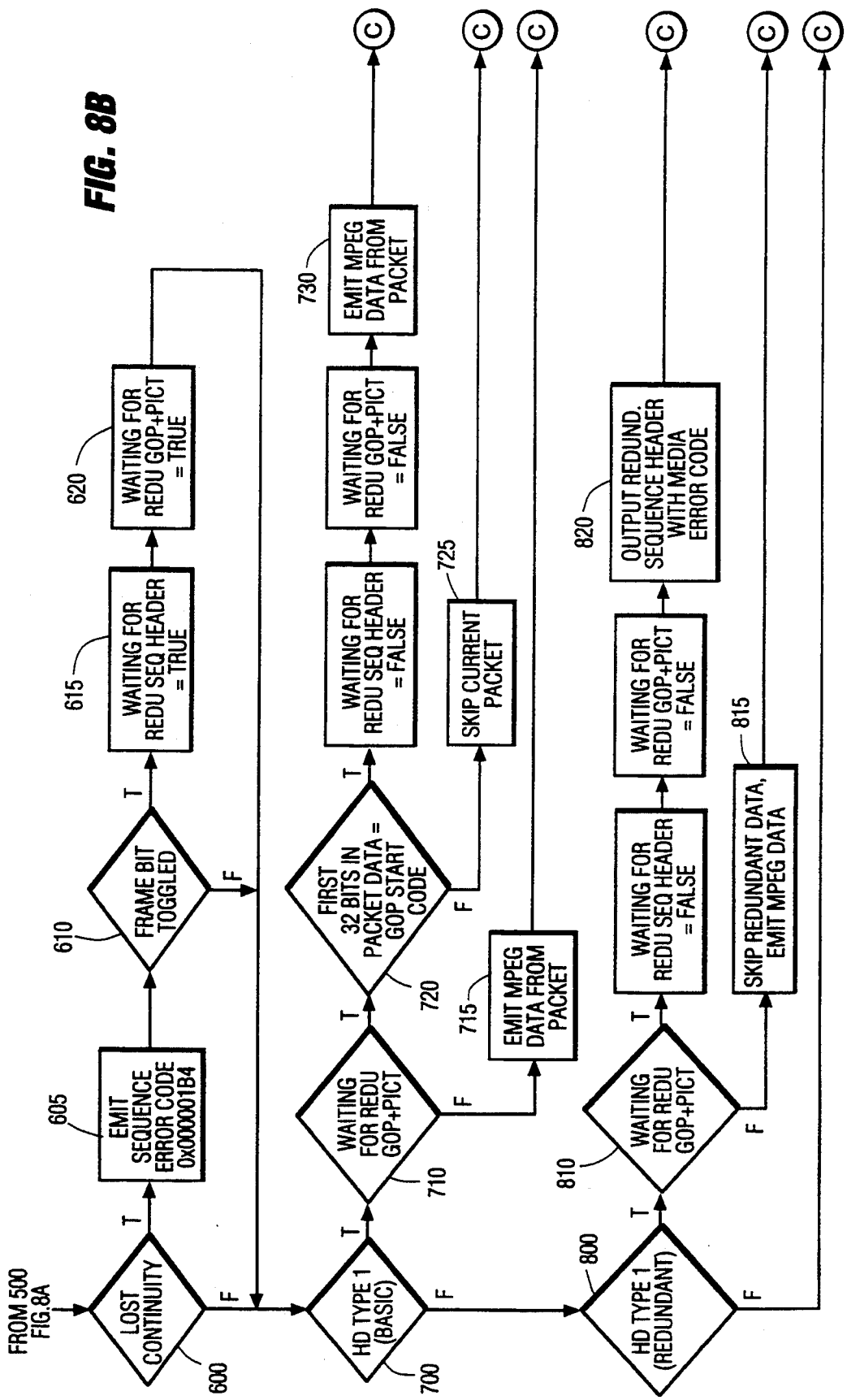

METHOD AND APPARATUS FOR CONVEYING COMPRESSED VIDEO DATA OVER A NOISY COMMUNICATION CHANNEL

This invention relates to video signal compression apparatus and more particularly to apparatus for generating and utilizing media error codes.

BACKGROUND OF THE INVENTION

Siracusa et al. in U.S. Pat. No. 5,289,276, describe a video signal compression system which includes circuitry for compressing video data to generate a hierarchically layered encoded compressed signal, such as MPEG. MPEG is a coding standard developed by the Moving Picture Experts Group of the International Standardization Organization. To insure high quality signal recovery, for signals broadcast in a terrestrial medium, such as according to the NTSC broadcast standard, the MPEG compressed signal is packetized in transport cells, each of which includes signal identifiers and error detection codes. Portions of the MPEG data which are particularly important to signal reconstruction, at a corresponding receiver, are formed in redundant cells and interleaved at predetermined locations in the cell sequence. The predetermined locations are arranged such that if the original particularly important data is lost, the probability of the redundant cell being concurrently lost is extremely small. Thus, a receiver for reproducing the compressed data, will have the requisite information available.

The receiver in the Siracusa et al. system includes an inverse packet or cell processor which performs a plurality of functions including reconstructing the MPEG data stream from the cell payloads, storing the data in redundant cells for use in case of lost data, recognizing loss of data, and generating media error codes. The signal provided by the inverse cell processor is applied to an MPEG decompression apparatus. The decompression apparatus expects data to occur in a specific sequence defined by the MPEG protocol. If data is lost, the data sequence is corrupted. If the decompressor is not alerted to the corruption of the compressed data sequence it will incorrectly process subsequent data. In view of these possibilities the decompressor is arranged to recognize a particular codeword (designated herein as a media error code), in the compressed data stream. Responsive to the media error code, the decompressor is conditioned to ignore data until the next occurrence of a start code. On reception of the next start code the decompressor resynchronizes to the current data.

Depending on when and what data is lost, generation and insertion of the media error codes into the data stream has created significant system timing problems. The timing problems are completely obviated by the present invention.

SUMMARY OF THE INVENTION

The present invention is incorporated in a transport cell processor for packetizing compressed video data including redundant cells of video data. The transport cell processor includes apparatus for producing media error codes and concatenating the media error codes with redundant compressed video data to form redundant cells.

In a further embodiment in receiver apparatus, an inverse transport cell processor includes apparatus for storing payloads of redundant cells including media error codes, and multiplexing redundant data including media error codes with compressed video data from basic transport cells when particular ones of transport cells are lost or corrupted.

BRIEF DESCRIPTION OF THE DRAWINGS

FIG. 2 is a schematic representation of a Transport Block for a video service included in a transport cell.

FIGS. 8A and 8B are a flowchart of operation of the transport decoder of a one-tier video system.

DETAILED DESCRIPTION

The transport protocol of the present invention includes three data protocol layers; a link layer; a transport layer; and a service layer. The link layer is arranged to be service independent, while the service layers are service specific. A "service" refers to the type of data being transmitted in a particular transport cell, e.g., audio data, video data, auxiliary data etc.

Figure 1:
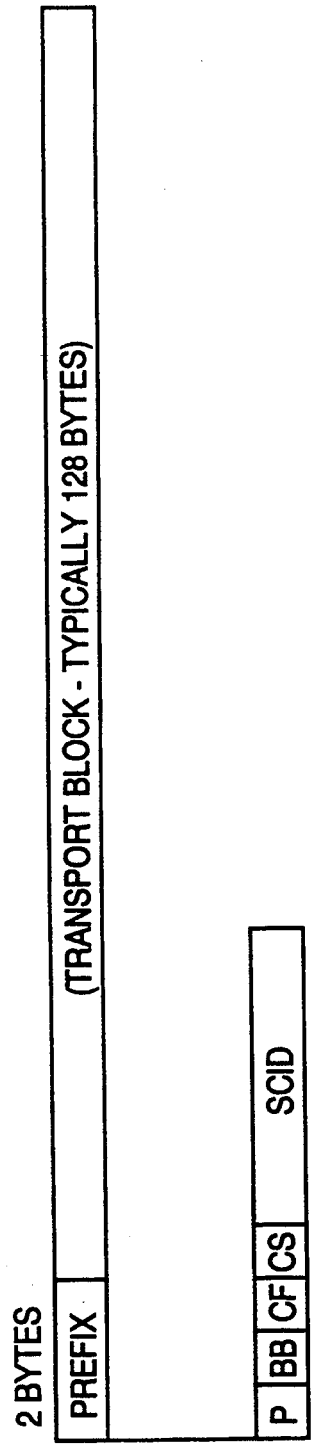
FIG. 1 is a schematic representation of a transport cell of the transport layer utilized in the invention.

The link layer comprises a Prefix byte (actually two eight bit bytes) which contain several link layer control flags as well as channel identifiers for many different video, audio and data services. FIG. 1 shows the logical structure of a transport cell indicating the relationship between the Prefix and the Transport Block. The designators P, BB, CF, and CS are all one bit designators. The designator, P, is used in a two tier system to identify whether the transport block includes high or low priority data (1=HP, 0=LP), and is used in a one tier system for cell framing by toggling in successive cells. The designator, BB defines a bundle boundary and is set to a "1" value only for the first cell of respective bundles. The designator, CF, is a control flag used to indicate a scrambling state. CS is a control sync bit which toggles with each scramble key change.

The designation SCID is a twelve bit word which is used to identify service types. A SCID value of zero is reserved for null cells, and the value 4095 is reserved for future definition. The remaining 4094 SCID values are available for defining various service types.

FIG. 2 illustrates the Video Transport Layer which is an example of one of many possible Transport Layer formats. Every service type can have a specific Transport Cell format. The first field of the video transport layer contains a 4-bit continuity count (CC). This count increments by one for each cell transmitted. It is service dependent and priority dependent, i.e., separate counts are maintained for each service identity and for each transmission priority tier. Discontinuities in the received count indicates either errors in received data or a loss of continuous data for a particular transport service.

The next field in the video transport layer contains a 4-bit Header Designator (HD) which has two-bit subfields of Type and Identity. The subfields identify the form of data transmitted in the respective data field. For the Video Transport Layer, HD types 0, 1, 2 and 3 (decimal) are used to respectively identify Auxiliary Packets, Basic Service Packets with, e.g., MPEG data, Basic Service Packets with MPEG redundant data, and Basic Service Packets with NON_MPEG data. The type "Basic Service Packets" (or Cells) is the only type identified which includes (in the example) MPEG data in standard form albeit segmented in transport cells The type "Auxiliary Packets" in general does not include MPEG signal though in this application it is used to transmit redundant MPEG header data. Nominally the Auxiliary Packets are used to transmit auxiliary data such as timing references, for example.

Basic Service cells are used to carry most of the MPEG encoded data.

On the other hand, two methods of carrying redundant MPEG data in the Transport Cell may be utilized. For purposes of this disclosure assume that the data to be transmitted redundantly is particular compressed video layer header data (for an example with greater specificity, see U.S. patent (Ser. No. 901,045 allowed to issue). One method uses a specific Auxiliary Packet to carry a copy of the particular MPEG data which is to be sent redundantly (which could span multiple cells). The second method uses a modification of the Basic Service Transport Block to carry the redundant MPEG data.

All information contained in the video service layer is supplied by the video encoder (and the priority processor in a two tier system. See U.S. Pat. No. 5,168,356 for a detailed description of a two tier system).

Specific formatting rules are required when encoding the Video Transport Cells and these rules require that:

A "Basic Service" transport cell format is used on the first cell of a GOP, and the first cell of respective successive frames.

A "Redundant Data" transport block format is used instead of the "Basic Service" format on the second cell of a frame if the frame spans multiple cells. The "Redundant Data" format is used again at an interval of about 4 to 8 times per frame.

The redundant transmissions of the MPEG Sequence header are carried as "Auxiliary Packets" at an interval of 5 to 30 per second.

Figure 3:
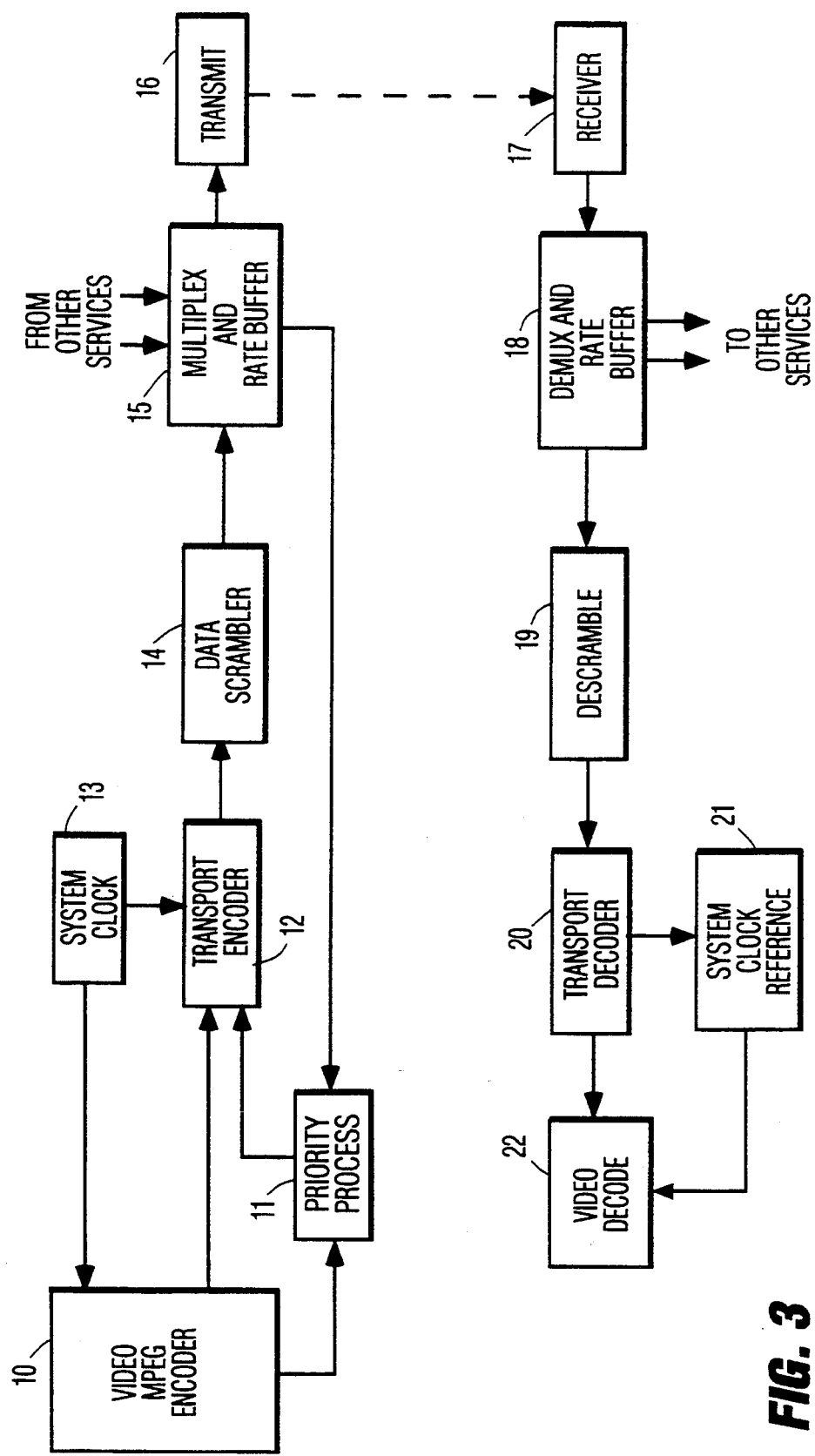
FIG. 3 is a system level block diagram identifying the transport encoder and decoder in the total system.

FIG. 3 is a block diagram of MPEG encoding/decoding apparatus including a transport cell encoder according to the present invention. The transport encoder takes (in this example) a MPEG data stream and attaches a protocol which:

Allows a transport decoder to detect missing or invalid data;

Offers redundant transmission of critical data including media error codes; and

Indicates data reentry points in respective cells which permit the restart of MPEG decoding.

Input to the transport encoder 12 is either directly from an MPEG encoder 10 (for a one tier transmission system) or from a MPEG priority processor 11 (for a two tier transmission system). In this application only one tier systems will be described though the invention is equally applicable to two tier systems. The MPEG encoded data is applied as input data to the transport encoder 12. A further input to the transport encoder 12 is provided by a system clock 13. This clock is incorporated to synchronize the receiver and transmitter. Responsive to the MPEG data and the data provided by the system clock, the encoder 12 forms the respective transport cells.

Output from the transport encoder 12 is sent to a service multiplexer and rate buffer 15 via a data scrambling mechanism 14. The multiplexer 15 interleaves data from different service sources. The output from the multiplexer 15 is applied to the communications channel via a transmitter 16.

A transport decoder receives cells from the communication channel receiver 17 via the service demultiplexer and rate buffer 18. The demultiplexer responsive to the data in the service type field of the respective transport cell headers, separates data of different service types, and applies the separated data types to the appropriate processing circuitry. Video output data from the demultiplexer 18 is coupled to a descrambler 19 which performs a descrambling function which is inverse to the scrambling function of element 14. Descrambled data is applied to a transport decoder or inverse transport processor 20, which separates header data from service data and applies the service data to a decoder 22.

Output from the transport decoder 20 provides both a system clock (21) for synchronizing the receiver to the transmitting service, and a data path to the MPEG decoder 22. Within the transport decoder, error checks are performed to determine whether a cell has been lost or includes errors. For example, the CC code is monitored to determine if respective transport cells occur in proper sequence. Only payloads from transport cells for which no errors are detected are delivered to the MPEG decoder. The transport decoder separates transport header data and MPEG payloads, and presents data to the MPEG decoder in a suitable format. If there is a cell discontinuity, the video transport decoder is programmed to initiate a sequence of resynchronizing tasks, as discussed below.

Figure 4:
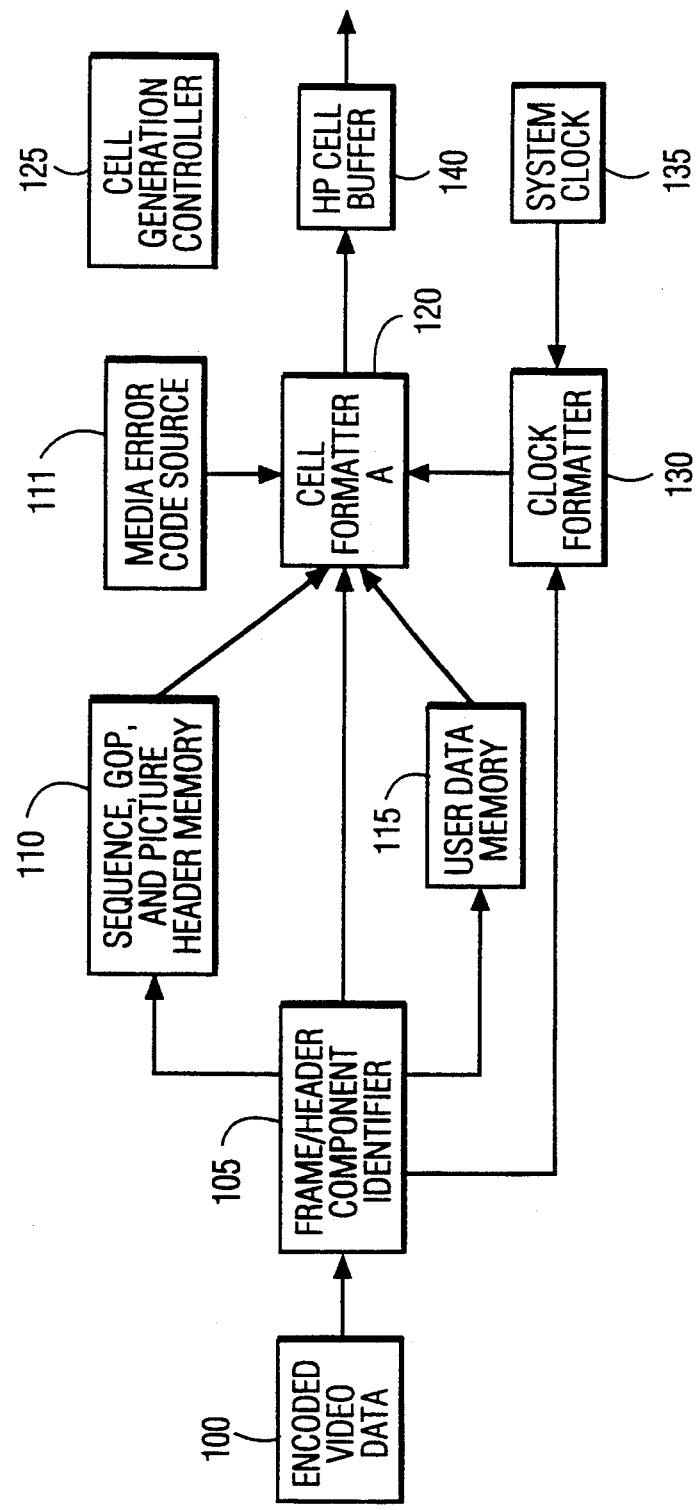
FIG. 4 is a block diagram of a typical transport encoder.

FIG. 4 is a block diagram of a transport encoder which may be implemented in a high definition television broadcast system. Encoded video codewords, and corresponding codeword identifying indicia related to codeword type, and codeword length arrive at the transport encoder from a video signal compressor 100. Element 105, responsive to the identifying indicia captures and stores certain of the header information in a memory element 110. Data stored in element 110 will be included in the transmitted data a plurality of times to provide a degree of information redundancy. The data selected for redundant transmission of MPEG data generally includes sequence header data, GOP header data, and Picture header (PICT) data. At a minimum the data selected as redundant data is that data necessary to condition a decoder to begin decoding a data stream which has been entered at other than the beginning of a data sequence.

Element 105 also extracts user data and applies this data to a memory 115. User data may be of many different types such as time stamps; whether the images are in color or not; the form of chrominance preprocessing etc. In general the user data is data of a type which is not normally included in the compressed signal protocol, such as the MPEG protocol. However inclusion of such information permits the receiver designer to incorporate special processing for particular signal types and thereby enhance the overall reproduction of images. The user data is included in auxiliary transport cells, when convenient. Element 105 also conditions the clock formatter 130 to provide time stamps on the occurrence of certain video data.

A source 111, which may be a read only memory or a combination of switches, is arranged to generate a predetermined sequence of binary bits representing media error codes.

Data from elements 105, 110, 111, 115 and 130 are coupled to a cell formatter 120. Nominally formatter 120 receives data from element 105, parses such data into cell length packages or payloads, develops the appropriate video service transport headers according to the protocol indicated in FIGS. 1 and 2. concatenates the transport headers and the payloads, and couples the transport cells to a cell buffer 140. However, at the start of a sequence of data, and periodically during the transmission of data, the formatter is conditioned by the controller 125 to form and transmit other data. This other data includes auxiliary information such as time stamps from the clock formatter 130 for signal synchronization, and redundant header data stored in memory element 110.

Auxiliary data cells are generated as needed and included in the data stream when space is available. The redundant data cells may be included at regularly spaced intervals or as data space is available but with at least a certain minimum inclusion of data to provide enough information to initiate decoding if normal header data is lost.

The cell formatter includes a continuity count in each transport cell. The continuity count, CC, is incremented by one unit in successive cells and repeats modulo N, where N may be a convenient binary number such as 16. Since Auxiliary data cells rarely occur successively, it is convenient to set the count CC equal to zero for all Auxiliary data cells. However, since one may increment the Auxiliary cell CC, if desired, the flowchart of FIG. 5 includes this functionality associated with Auxiliary data cells.

Figure 5:
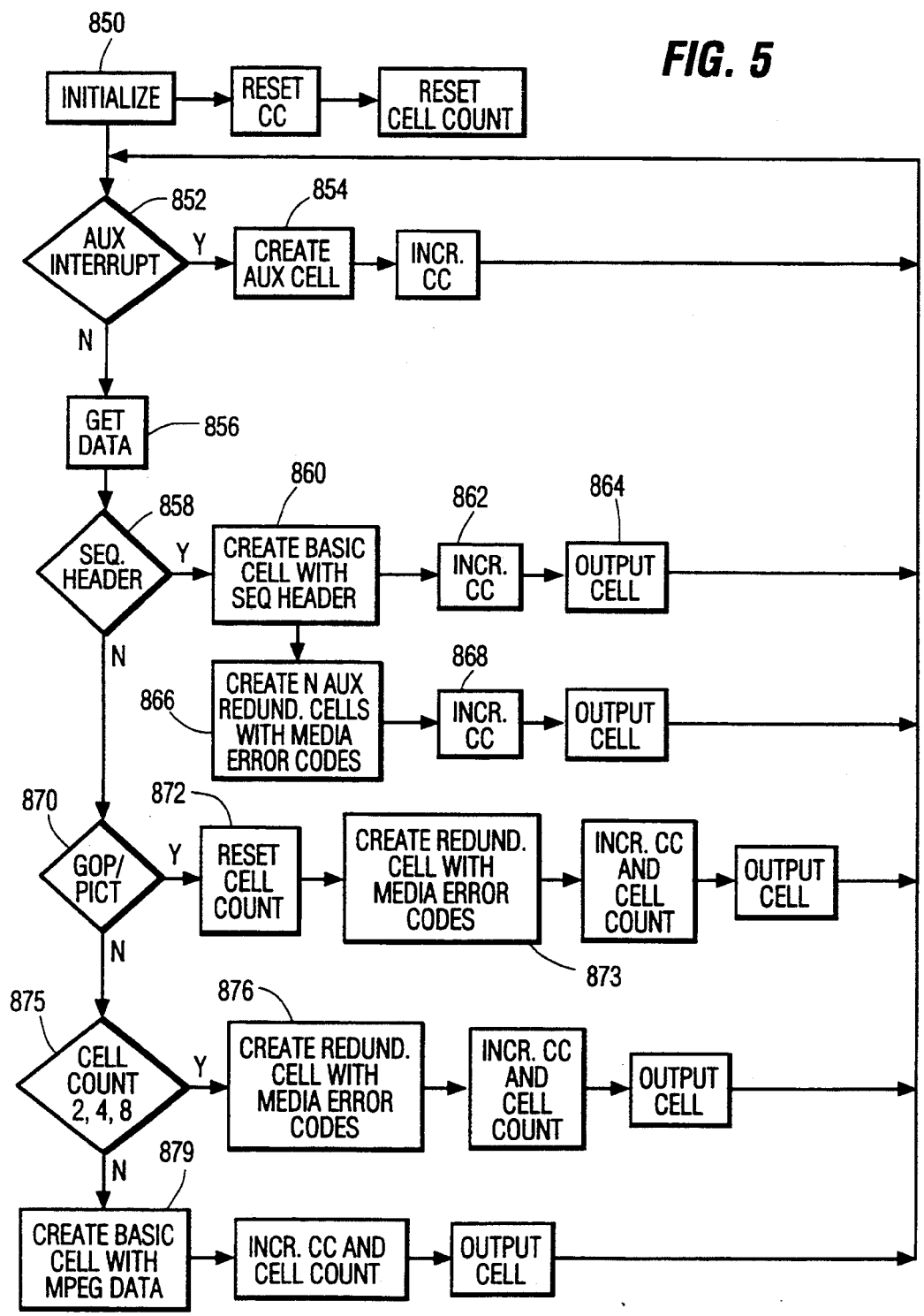
FIG. 5 is a flowchart representing operation of the transport encoder.

Referring to the flowchart of FIG. 5, the controller 125 initializes the system (850) by resetting the continuity counters (CC) and a cell count. It then checks (852) for an auxiliary data interrupt. These interrupts allow the user to interpose special information (if desired) for transmission. If an auxiliary interrupt has occurred, an auxiliary cell is created (854) and coupled to the rate buffer, and the auxiliary CC is incremented. If there is currently no channel space available, the system is directed to access MPEG data (856).

The MPEG data is checked for the occurrence of a sequence header (858). If a sequence header is available, a basic cell type is created (860) using the sequence header data. The basic cell continuity count is incremented (862) and the cell is output (864) to the rate buffer. Following creation of the basic cell type with the sequence header data, N auxiliary type cells are created using the sequence header data. Here N is a small integer such as four. Each of the N auxiliary type cells are output, and the auxiliary continuity count is incremented with the production of each cell.

Figure 6:
FIG. 6 is a pictorial representation of a redundant cell including media error codes.

Redundant cells are formed by concatenating data from the respective elements 105, 110, 111. The formatter 120, conditioned by the controller 125 provides the appropriate cell header data. A media error code from the source 111 is concatenated to the cell header. The media error code is followed by redundant data sourced from the memory 110. A second media error code is appended to the end of the redundant data. If after the foregoing information is included in the cell, there is available data space, compressed video data may also be included in the cell. FIG. 6 illustrates the general format of a redundant cell with media error codes. (Note, if the cell containing redundant data is an auxiliary cell, compressed video data will not be included.)

Alternatively, if at step 858 (FIG. 5) sequence header data is not available, a test is performed to determine the occurrence of group of picture (GOP) or picture (PICT) header data (870). If GOP/PICT header data is available the cell count is reset (872) and a redundant type cell is created with the GOP/PICT header data (873). If space is available within the cell further MPEG data is included. The cell is output and the redundant cell continuity count and the cell count are incremented. Note at tests 858 and 870 if sequence headers or GOP or PICT headers are available, they are stored in memory element 110 for use in forming redundant cells of the same data.

If at test 870 the current MPEG data is not GOP/PICT header data, the cell count is tested. If the cell count is not, for example, 2, 4 or 8 then a basic type cell is created with the current MPEG data. Alternatively, if the cell count is 2, 4 or 8 then a redundant type cell is created with the last occurring GOP/PICT header data.

Information (except video data) necessary to generate the sequence of transport cells is programmed into the cell formatter 120 and the controller 125. Responsive to respective start codes, the formatter and controller are conditioned to produce frame specific sequences of transport cells, and responsive to the type of transport cell to be generated appropriate transport header information is accessed from, e.g., internal memory or continuity counters. Once the transport cell sequence is established, forming the requisite transport cells involves simply time division multiplexing the relevant data.

Figure 7:
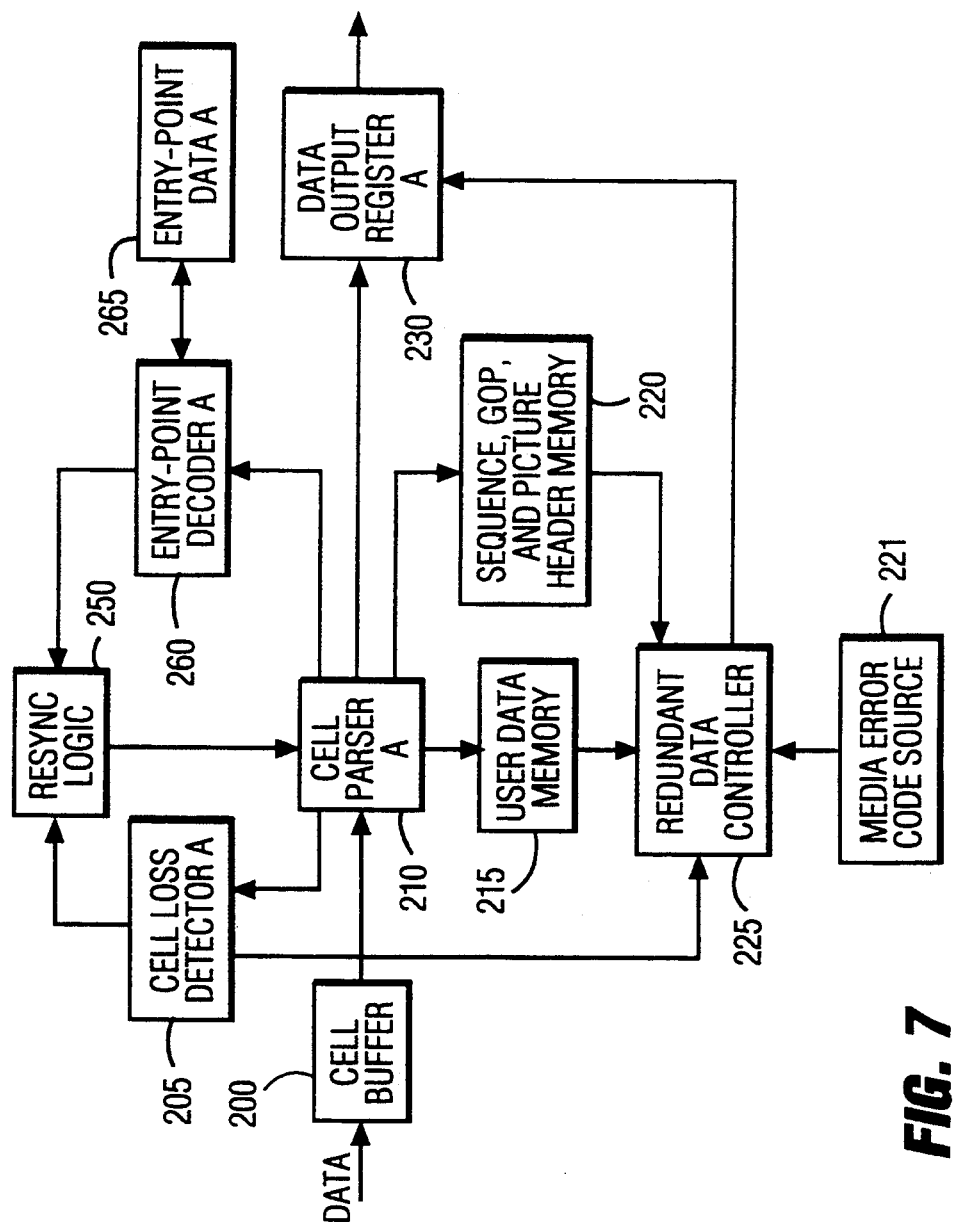
FIG. 7 is a block diagram of a typical transport decoder.

FIG. 7 is a block diagram of a typical transport decoder. As indicated previously, respective cells include cell Continuity Counts (CC) to provide a minimal indication of whether a cell has been lost or corrupted during transmission. Additional loss indicators may be provided at the encoder, by inclusion of error detecting cyclic redundancy codes or forward error correcting codes appended to respective transport cells. At the decoder these loss indicators are detected to determine if cells are lost or corrupted. Only errorless transport cells are delivered to the video decompressor. The video transport decoder removes entry-point data and transport header data from respective transport cells, decodes the entry and transport header data, and responsive thereto provides data to the MPEG decoder in a suitable format. If there is a cell discontinuity, the video transport decoder is conditioned to initiate a sequence of resynchronizing tasks, as discussed below.

Transport cells are provided to the transport decoder via a transport cell buffer 200. Programmed to respond to the encoded protocol, a cell parser 210 decodes the cell headers and separates respective service types of data. Auxiliary user data is directed to and stored in a memory 215. Redundant MPEG Sequence headers, GOP headers, and Picture headers with media error codes concatenated thereto are directed to and stored in a further memory 220. Normally occurring MPEG data (from basic service cells) is passed to an output register 230 from which it is supplied to the MPEG decoder. Based on an indication of cell loss in function 205, and the redundant data stored in memory 220, the redundant data controller 225 will supply the appropriate redundant data with the media error codes concatenated from memories 215 and 220, to condition the MPEG decoder to continue decoding or resynchronize.

FIG. 8 shows a typical transport decoder algorithm. This algorithm includes an initialization sequence (300), and functions to process each cell (beginning at 400). The initialization sequence 300, sets two flags (301, 302), which control waiting for redundant MPEG data in the transport protocol, to a "false state". Initialization produces (303) a media error code to the MPEG decoder, so that the MPEG decoder is conditioned to wait for the next start-code when decoding resumes. This media error code, which is the same as the media error codes concatenated with redundant data in the encoder, is provided by a media error code generator 221, which may be a memory cell.

On completion of initialization, the system begins (400) processing respective transport cells. In this example, there are three possible processing paths dependent upon the state of the Header Designator (HD) in the respective cell. For HD type 0 (Aux cells), processing begins at decision stage (500), for HD type 1 (Basic cells), processing begins at decision stage (700), and for HD Type 2 (Redundant Cells), processing begins at decision stage (800). There is a check for lost cell continuity at decision stage (600) before processing of the MPEG data cells begins at points (700) and (800).

Auxiliary cell processing begins at decision stage (500). A test is performed on the AUX Header Designator Identity. If the identity is 0 (test 510), then this cell contains an auxiliary data group, and the cell is processed at function (515). If at test (510), the Identity is not 0, then a test (520) is employed to determine if the decoder is waiting to recover redundant Sequence Header information. If not, the algorithm proceeds to get the next cell at (400). If a Sequence Header is needed, and this cell includes a redundant Sequence Header (test 530), then the decoder outputs (535) the redundant sequence header with the concatenated media error code. This media error code conditions the MPEG decoder to be prepared to start processing at a new entry-point. A check is made (560) to see if a complete Redundant Sequence Header is in the cell. This check may be performed by determining if a trailing media error code is within the cell. If the cell is not complete the system returns to step 400. If the cell does include a complete Redundant Sequence Header then the flag "Waiting For Redundant Sequence Header" is set to false (565) and the system returns to step 400.

At step 530, if HD ID is not equal to 2, the continuity count is checked (540), and if the count is proper, the cell includes a remaining part of a Redundant Sequence Header which is then output (550). A check is again made (560) to determine if the Redundant Header is complete and so on. If on the other hand the continuity count is in error, the system is reset (545) to begin reprocessing of a Sequence Header.

Before MPEG data cells (other than, e.g., GOP or Pict headers) are used, a check is made (600) for lost continuity. If there is a loss, a check is made on Prefix bit P (610) to determine if a frame boundary has been crossed. If a new frame boundary has been crossed during the loss, control flags are set true (615, 620) waiting for redundant MPEG headers and the system steps to test 700. If a new frame boundary has not been crossed (610) the system simply steps to test 200.

If the cell is a Basic cell type (test 700), a check is made (710) to determine if the decoder is in a state waiting for redundant GOP+PICT headers (710). If it is not waiting for redundant headers, the MPEG data cell is forwarded (715) to the MPEG decoder.

If the decoder is waiting for redundant headers, a check is performed (720) to determine if the current cell has the needed header embedded in the MPEG stream. The start of all frames is cell aligned, so if the first 32 bits of the cell is a MPEG start code, the needed headers will be available to the MPEG decoder within the MPEG stream. If the decoder is waiting for a redundant header, and it is not embedded, then the good cell is skipped (725). If the decoder is waiting for a redundant header, and it is embedded, the control flags waiting for redundant headers are set false, and the cell is forwarded (730) to the MPEG decoder.

If the cell is a Redundant cell type (test 800), and the transport decoder is not waiting for redundant information (810), the redundant data is skipped (815), and the remaining data in this cell is forwarded to the MPEG decoder. If the cell is a Redundant cell type (test 800), and the transport decoder is waiting for redundant information (test 810), the redundant header information from this cell with concatenated media error codes and further MPEG data, if included, is forwarded (820) to the MPEG decoder. The control flags waiting for redundant headers are set false.

Figure 8A:
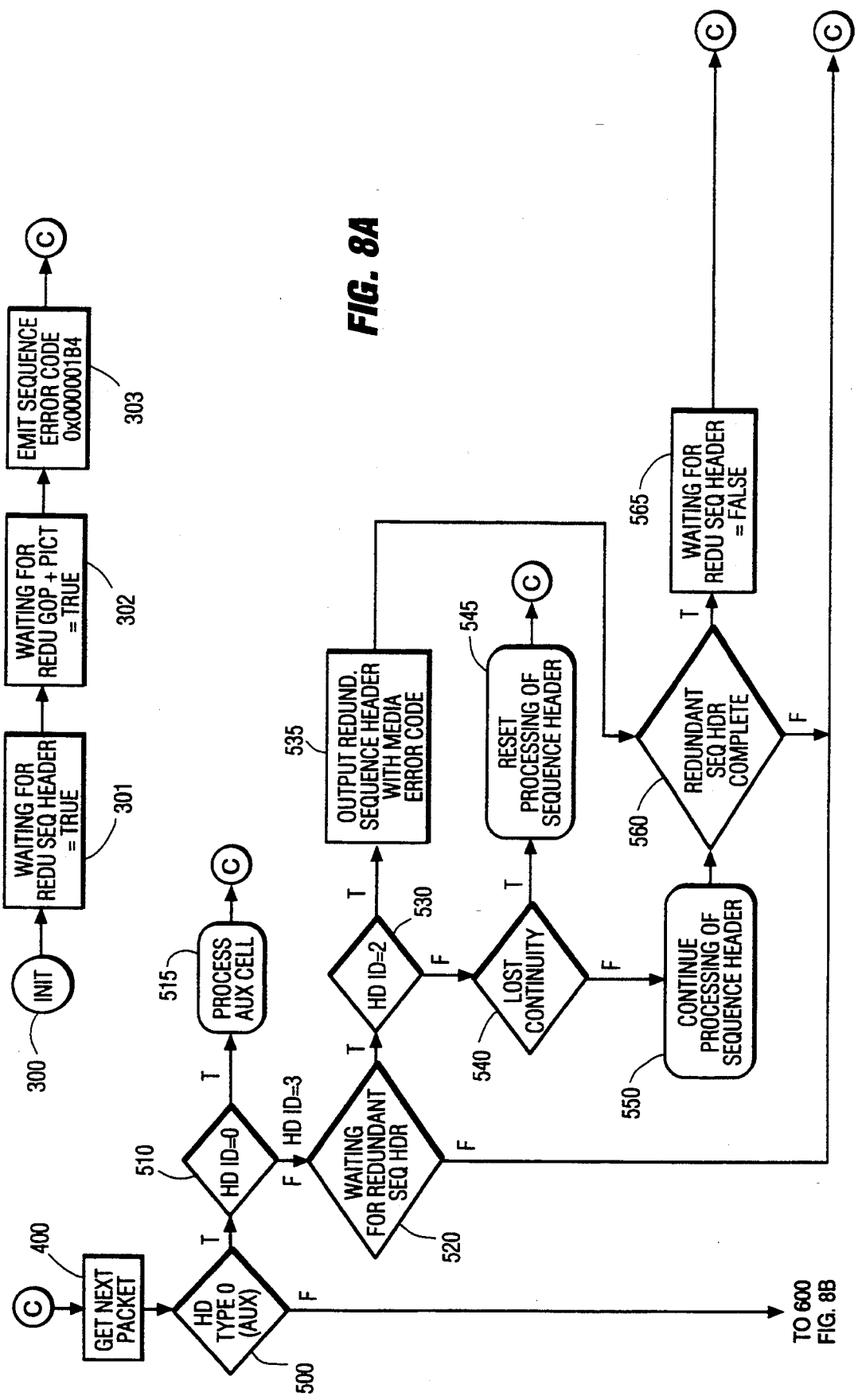

Note that the only time the decoder is required to create and insert a media error code is during transport decoder initialization (step 303, FIG. 8A). During initialization the system is not under significant timing constraints, hence no problems are encountered by having the decoder produce the media error codes. At all other instances when media error codes are needed, they are found embedded in the transmitted data stream.

Also note that normally, media error codes will not be needed ahead of redundant sequence headers because such media error codes are those codes provided by the decoder during initialization. The media error codes which are included after redundant header data may be superfluous in certain situations, but it is convenient to include them in all situations. In the exemplary system illustrated, it is assumed that data which would normally follow redundant data will start with a start code. If the redundant data is inserted in the output data stream immediately ahead of a start code, the media error code is not necessary, but inclusion thereof is not detrimental. If the redundant data is inserted in the output data stream at a point not followed by a start code, the decompressor will not properly process subsequent data. In this instance the media error code is required to instruct the decompressor to wait for the next start code after which it will properly process subsequent data. Inclusion of the trailing media error codes with all redundant data obviates having to examine the point at which redundant data is inserted into the data stream and generating system resynchronizing commands, if necessary.

Finally, since data and redundant data occur in the appropriate sequence for decoding, it is generally not necessary to store redundant data at the decoder. If desired data is lost, the system may be arranged to wait for the next occurring redundant data which will be identified by the service header, and the system will be reset by the leading media error code associated with the redundant data.

What is claimed is:

1. Apparatus for formatting compressed video data, including header data having particular significance to the recovery of video images, in transport cells, comprising:
- a source of said compressed video data;
- means for segmenting said compressed video data into payloads, respective payloads having a predetermined maximum amount of data; and for forming cell header data which identifies, in part, respective payloads and concatenating corresponding payloads and cell headers to form basic data transport cells;
- a source of media error codes;
- means for forming redundant cell payloads of portions of said header data having particular significance with at least one media error code concatenated thereto; forming cell header data which identifies respective redundant cell payloads as redundant data, and concatenating corresponding cell header and redundant cell payloads to form redundant data transport cells; and
- means for interleaving basic data and redundant data transport cells in a predetermined sequence.

2. The apparatus set forth in claim 1 wherein said means for forming redundant cell payloads includes means for concatenating respective media error codes both before and after said portions of said header data.

3. Apparatus for providing a compressed video signal in a sequence of interleaved transport cells, respective ones of said transport cells, designated basic cells, including payloads of compressed video data with transport cell headers identifying in part, corresponding payloads, and respective others of said transport cells designated redundant cells, including payloads of redundant compressed video data concatenated with media error codes.

4. An inverse transport processor for processing transport cells of compressed signal, ones of said transport cells containing payloads of compressed video data and others of said transport cells containing payloads of redundant portions of said compressed video data concatenated with media error codes, respective transport cells including indicia identifying corresponding cells as containing compressed video data or redundant portions of said compressed video data, and wherein said media error codes are for use by a compressed video signal decompressor, said inverse transport processor comprising:
- a source of said transport cells;
- circuit means responsive to the occurrence of successive transport cells for detecting lost or erred transport cells;
- further circuit means, responsive to the absence of lost or erred transport cells for selecting transport cells and providing their respective payloads to video decompressor apparatus in the order of their occurrence to the exclusion of payloads of redundant portions of said compressed video data, and on the occurrence of lost transport cells providing a payload of Said redundant portions of said compressed video data with media error codes concatenated thereto.

5. The inverse transport processor set forth in claim 4 further including:
- a source of media error codes; and
- means responsive to predetermined processing states of said inverse transport processor for interleaving media error codes from said source of media error codes with payloads of compressed video data output by said further circuit means.

* * * * *

UNITED STATES PATENT AND TRADEMARK OFFICE
CERTIFICATE OF CORRECTION

PATENT NO. : 5,376,969

DATED : December 27, 1994

INVENTOR(S) : Joel Walter Zdepski

It is certified that error appears in the above-identified patent and that said Letters Patent is hereby corrected as shown below:

On title page, item:[54] and column 1, delete:

"METHOD AND APPARATUS FOR
CONVEYING COMPRESSED VIDEO DATA
OVER A NOISY COMMUNICATION CHANNEL"

At [54] insert:

--**TRANSPORT APPARATUS FOR
COMPRESSED VIDEO SIGNAL**--

In column 1, lines 2 through 4, delete "METHOD AND APPARATUS FOR CONVEYING COMPRESSED VIDEO DATA OVER A NOISY COMMUNICATION CHANNEL"

In column 1, lines 2 through 4, insert:

--**TRANSPORT APPARATUS FOR
COMPRESSED VIDEO SIGNAL**--

UNITED STATES PATENT AND TRADEMARK OFFICE
CERTIFICATE OF CORRECTION

PATENT NO.   : 5,376,969
DATED        : December 27, 1994
INVENTOR(S)  : Joel Walter Zdepski It is certified that error appears in the above-identified patent and that said Letters Patent is hereby corrected as shown below:

In column 1, line 11, after "5,289,276," insert --METHOD AND APPARATUS FOR CONVEYING COMPRESSED VIDEO DATA OVER A NOISY COMMUNICATION CHANNEL--

In column 10, line 24, delete "Said" and insert --said--

Signed and Sealed this

Tenth Day of October, 1995

BRUCE LEHMAN

*Attest:*

*Attesting Officer*            *Commissioner of Patents and Trademarks*